United States Patent [19]
Rutt et al.

[11] 3,984,633
[45] Oct. 5, 1976

[54] APPARATUS FOR ALTERING THE POSITION OF A VIDEO IMAGE WITHOUT RESCANNING OF THE ORIGINALLY GENERATED IMAGE

[75] Inventors: Steven A. Rutt, New Rochelle, N.Y.; Robert A. Diamond, Montrose, Pa.

[73] Assignee: Steven A. Rutt, New Rochelle, N.Y.

[22] Filed: Nov. 15, 1974

[21] Appl. No.: 524,378

[52] U.S. Cl. .............................. 178/69.5 TV; 178/6; 178/7.1; 178/7.3 R; 178/DIG. 6; 178/6.8
[51] Int. Cl.² ..................... H04N 5/04; H04N 5/22
[58] Field of Search ............... 178/DIG. 6, DIG. 21, 178/69.5 TV, 69.5 CB, DIG. 35, 6.8, 6, 7.1, 7.2, 7.3 R, 7.5 R, 7.5 D, 7.3 D; 358/22; 360/33, 37; 35/10.2, 11 R, 11 A, 12 N

[56] References Cited
UNITED STATES PATENTS

| | | | |
|---|---|---|---|
| 3,420,953 | 1/1969 | Wolff | 178/69.5 TV |
| 3,517,121 | 6/1970 | Petrocelli et al. | 35/10.2 |
| 3,525,804 | 8/1970 | Owen | 178/DIG. 35 |
| 3,612,761 | 10/1971 | Wolff | 178/DIG. 35 |

*Primary Examiner*—John C. Martin
*Attorney, Agent, or Firm*—Hubbell, Cohen, Stiefel & Gross

[57] ABSTRACT

An apparatus for altering the position of a video image, such as an image produced by a video camera, video tape recorder or other image producing device utilizing a raster type scan, without rescanning of the originally generated image alters, by a precise amount, the phase of a video camera or playback device with relation to the overall system or plant sync, while maintaining exact sync timing relationships for all timing pulses fed to the video camera or playback device. The video from the camera or playback device is processed so as to restore its blanking and sync timing to match the timing of other video sources within the system. The horizontal and vertical sync pulses fed to the camera or playback device, such as a video tape recorder, which generates the original image or raster have their phase shifted to accomplish movement of the original image by generating the horizontal and vertical sync pulses from a color subcarrier while keeping phase lock to the sub carrier with the phase shifted sync being reinserted in the picture portion of the original picture signal while the original picture sync is deleted and made to look like a picture signal. This phase shifted sync effectively moves the picture to the left or right or up or down to reposition the image.

10 Claims, 12 Drawing Figures

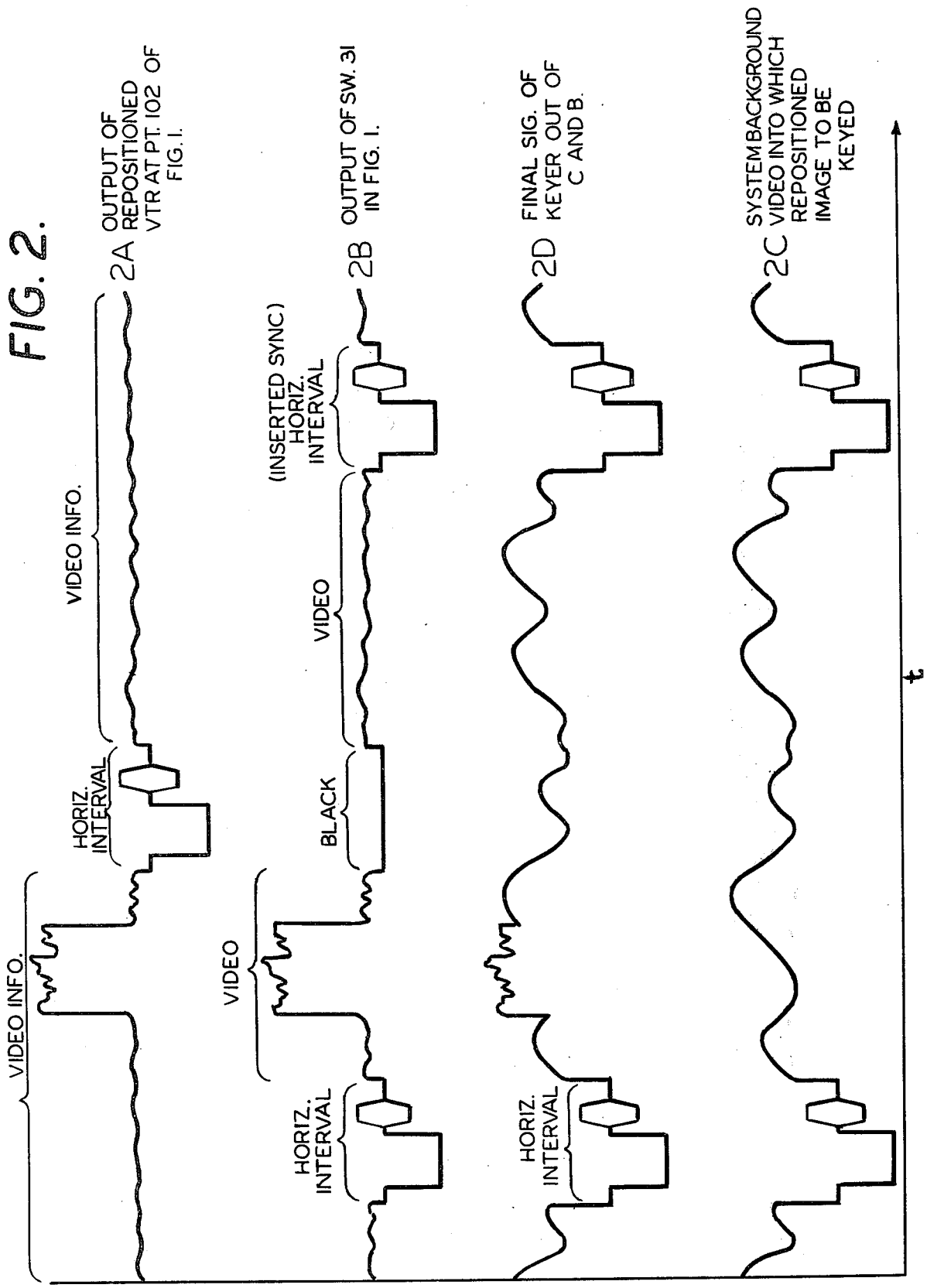

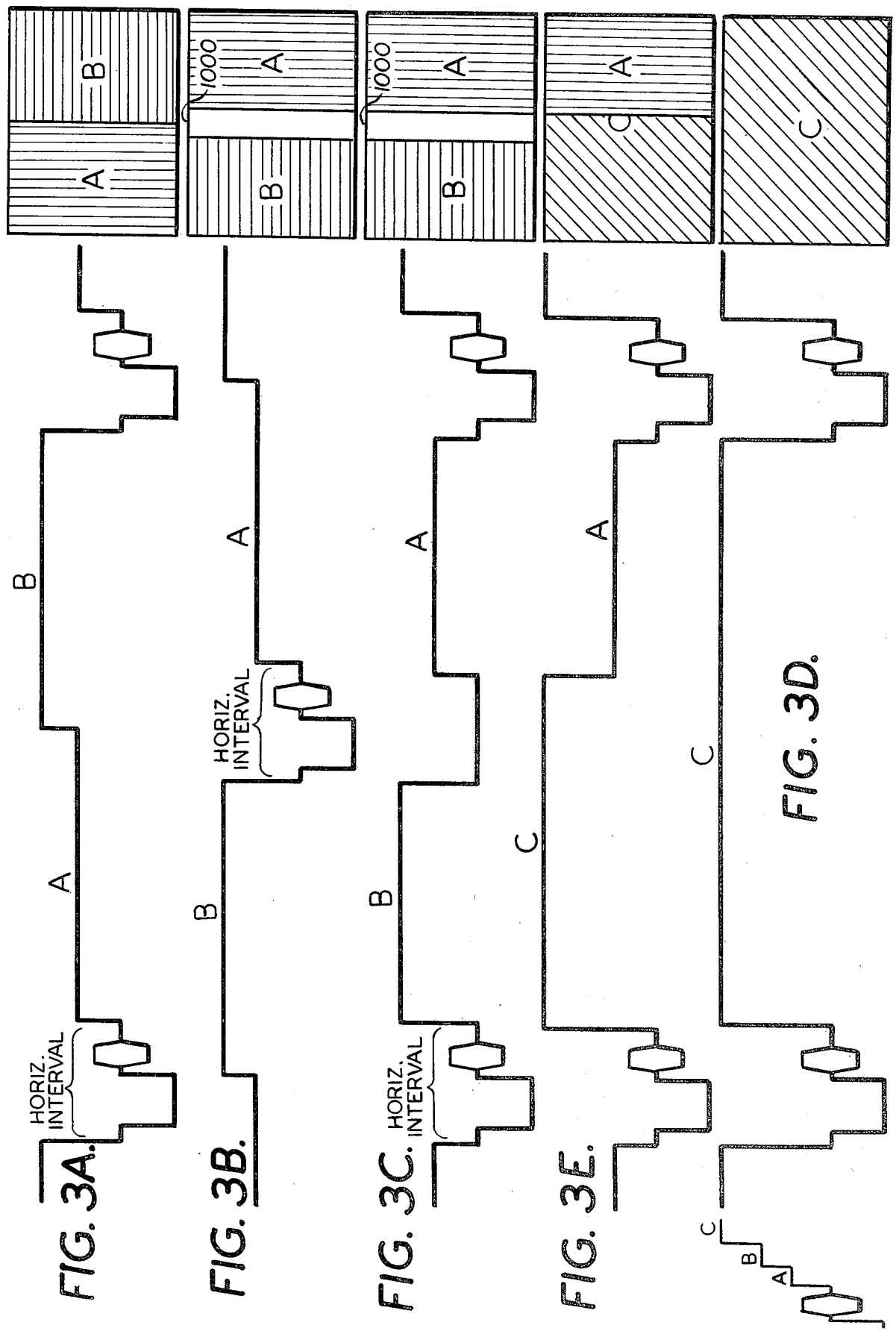

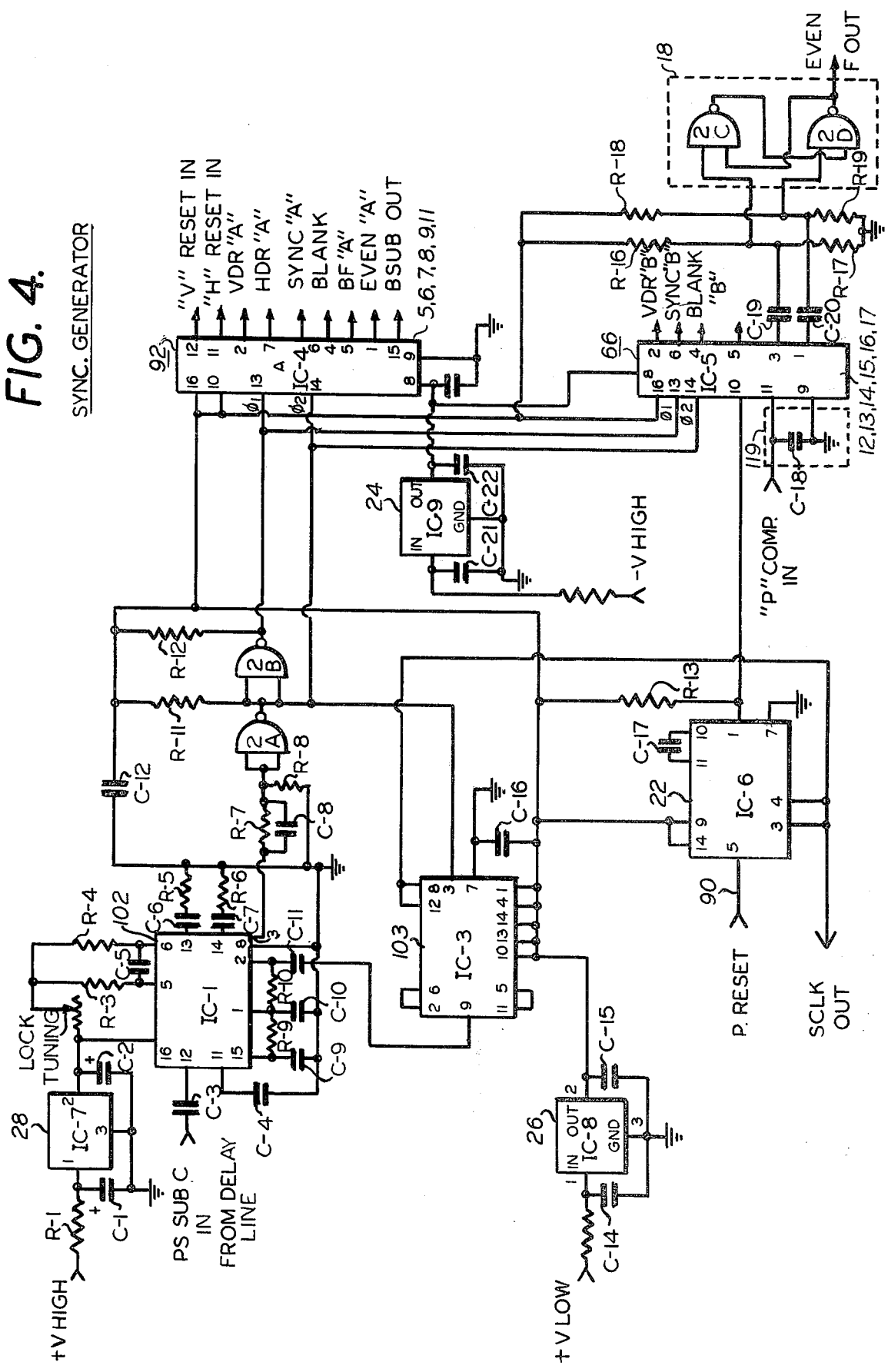
FIG. 4. SYNC. GENERATOR

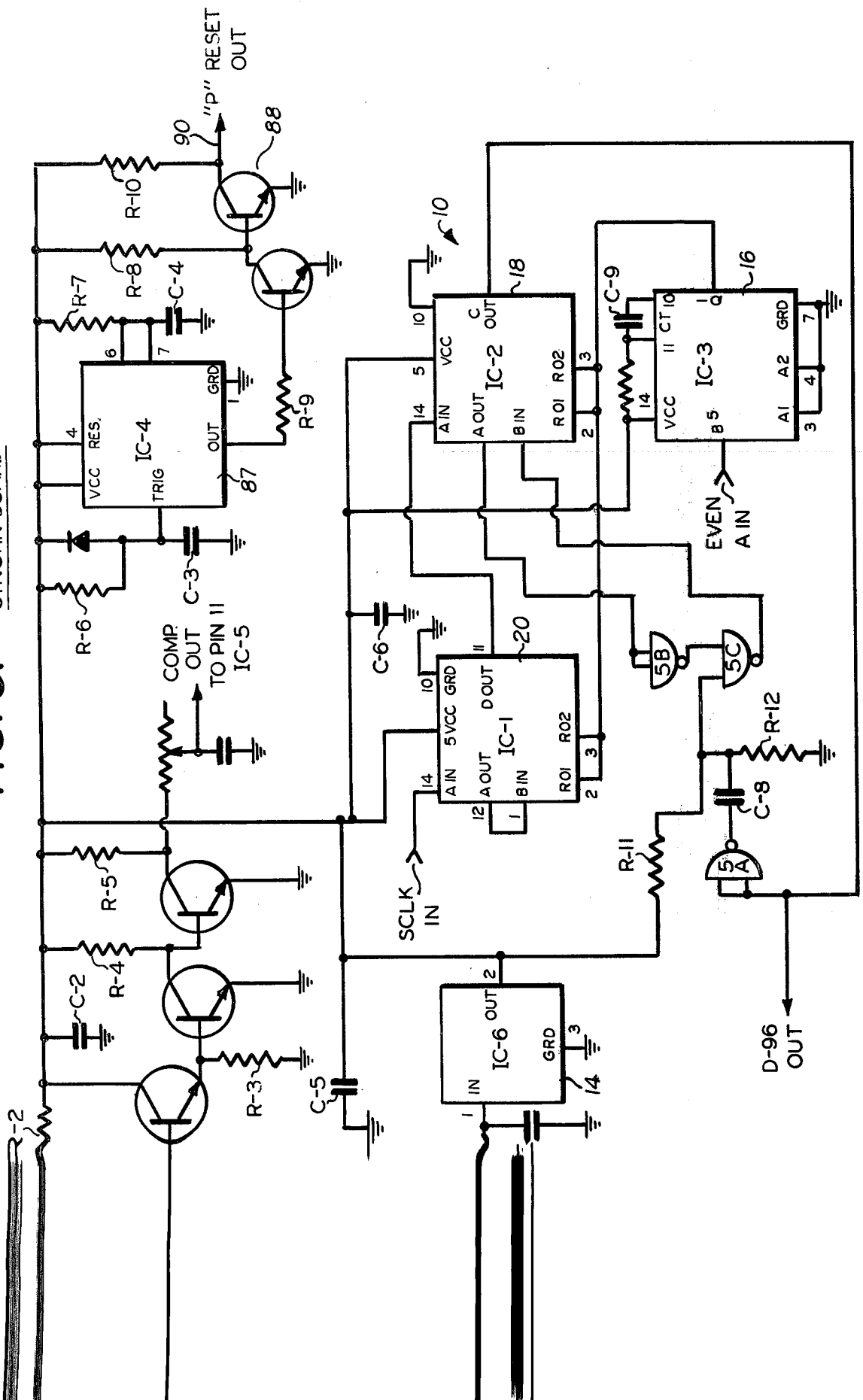
FIG. 5. SYNC. IN BOARD

APPARATUS FOR ALTERING THE POSITION OF A VIDEO IMAGE WITHOUT RESCANNING OF THE ORIGINALLY GENERATED IMAGE

BACKGROUND OF THE INVENTION

1. Field of the Invention

The present invention relates to apparatus for altering the position of a video image without rescanning of the originally generated image.

2. Description of the Prior Art

Prior art image repositioning systems, such as described in U.S. Pat. No. 3,420,953, by way of example, move or reposition a video image without rescanning of the originally generated image by altering the phase of the vertical and horizontal sync pulses fed to the camera or playback device which generates the original image or raster. While this approach has been satisfactory in some instances, it has been difficult to employ these techniques in many television systems, such as where the original image to be repositioned is from a video tape recorder, in which instance precise sync timing is required. In such prior art systems, due to the inertia in the mechanical components of the tape recorder, the recorder is not able to correct for timing errors caused by drift of horizontal and vertical timing in relation to each other, such as when an analog timing circuit is utilized to delay the sync feeding the video tape recorder and the vertical sync pulse is not generated in the proper relationship to the horizontal sync pulse. Thus, this inherent problem in video tape recorder head drums resulting from the mechanical inertia therein which prevents compensation for sync timing errors has produced unsatisfactory results in the prior art repositioning of such originally generated images. These disadvantages of the prior art are overcome by the present invention.

SUMMARY OF THE INVENTION

An apparatus for altering the position of a video image, such as an image produced by a video camera, video tape recorder or other image producing device utilizing a raster type scan, without rescanning of the originally generated image alters, by a precise amount, the phase of a video camera or playback device with relation to the overall system or plant sync, while maintaining exact sync timing relationships for all timing pulses fed to the video camera or playback device. The video from the camera or playback device is processed so as to restore its blanking and sync timing to match the timing of other video sources within the system. The horizontal and vertical sync pulses fed to the camera or playback device, such as a video tape recorder, which generates the original image or raster have their phase shifted to accomplish movement of the original image by generating the horizontal and vertical sync pulses from a color subcarrier while keeping phase lock to the subcarrier with the phase shifted sync being reinserted in the picture portion of the original picture signal while the original picture sync is deleted and made to look like a picture signal. This phase shifted sync effectively moves the picture to the left or right or up or down to reposition the image.

Describing the present invention in greater detail, an apparatus for altering the displayable position of an originally generated video image on a video display device without rescanning of said originally generated image, said image being originally generated by a controllable image producing device utilizing a raster type scan for providing an originally generated video signal having a video picture portion and a composite sync portion, said video display device being operable with said controllable image producing device for producing a display of said video image from said video signal, said apparatus comprises means for receiving a system color subcarrier reference signal and generating a clock therefrom; a master sync signal processing means for locking to and maintaining a predetermined phase relationship for a system reference sync signal; a slave sync signal generation means having a variable controllable phase shift, said slave sync signal generation means comprising first digital counting means operatively connected to said system color subcarrier receiving means and being responsive to said clock signal by providing a first horizontal line frequency video signal output and a first vertical fold rate video signal output therefrom, said slave sync signal generation means outputs being provided to said controllable image producing device for control of the displayable image provided therefrom, said first digital counting means being resettable and being operatively connected in a feedback loop between the output thereof and the reset input thereof, said first digital counting means having a normal reset frequency corresponding to the reset frequency of the master sync signal processing means said feedback loop comprising means for controllably varying the reset frequency of said first digital counting means from the reset frequency of said master sync signal processing means, said reset frequency varying means comprising means for providing a reset pulse derived from said first digital counting means output to said digital counting means reset input at a predetermined controllable interval different from the normal reset frequency of said first digital counting means output to said first digital counting means reset input at a predetermined controllable interval different from the normal reset frequency of said first digital counting means, said first digital counting means effectively providing a controllable predetermined phase shift in said slave sync signal outputs with respect to said master sync signal when said reset frequency is controllably varied; and means for processing the normal video output from said controllable image producing device with said slave sync signal generation means output for both reinserting said system sync signal output of said master sync signal processor in the phase shifted video picture portion of the originally generated video signal at the normal video sync signal location and providing color black in place of said phase shifted originally generated composite sync, whereby a video output signal comprising phase shifted originally generated video picture information and timing information in phase with system sync is provided for producing a repositioned displayable video image.

BRIEF DESCRIPTION OF THE DRAWINGS

FIGS. 2A through 2D are graphic illustrations of the composite signals utilized with the embodiment shown in FIG. 1;

FIGS. 3A through 3E are pictorial illustrations of the composite signals and associated displays utilized in explaining the operation of the embodiment shown in FIG. 1;

FIG. 4 is a logic diagram, partically in schematic, of the slave sync generator portion and associated circuitry of the embodiment shown in FIG. 1;

FIG. 5 is a logic diagram partially in schematic of the sync delay, digital delay counter and power reset generator portions of the embodiment shown in FIG. 1;

FIG. 6 is a schematic diagram, partially in block of the color subcarrier shaper and buffer portion of the embodiment shown in FIG. 1;

DETAILED DESCRIPTION OF THE PREFERRED EMBODIMENT

Figure 1:
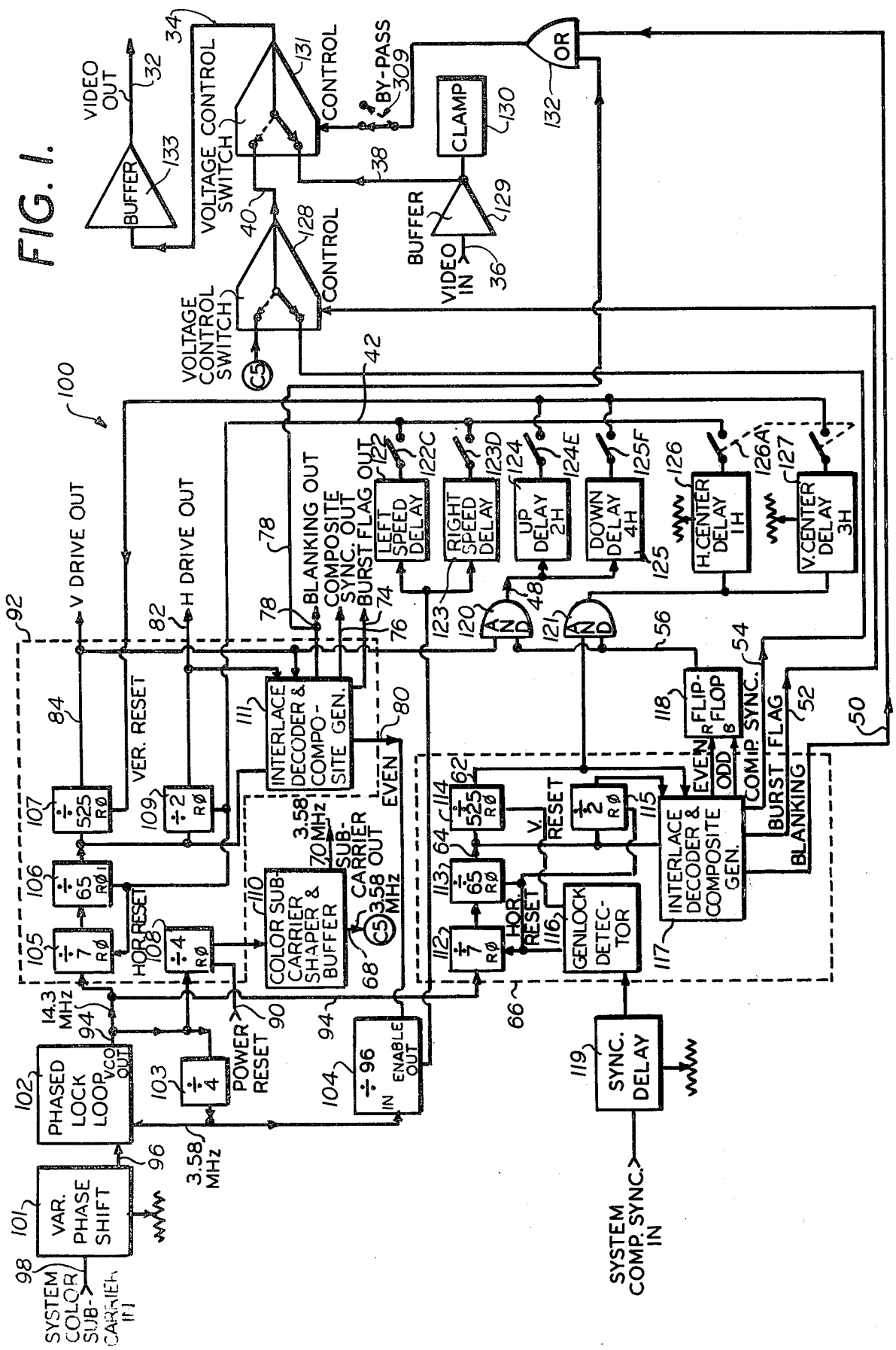
FIG. 1 is a block diagram of the preferred embodiment of the overall image repositioning system of the present invention.

Referring now to the drawings in detail and initially to FIG. 1 thereof, a block diagram of the preferred embodiment of the overall image repositioning system, generally referred to by the reference numeral 100, of the present invention is shown. The system 100 of the present invention preferably receives as an input thereto the system or plant color subcarrier input via path 98 which signal is the conventional 3.58 magahertz color subcarrier. This signal is fed to a conventional variable phase shifter 101, such as a Data Delay Devices 6367441 variable delay line, which enables direct phasing of the system color subcarrier with the system sync. This phase shifted color subcarrier is provided via path 96 to a conventional phase locked loop, such as an integrated circuit phase locked loop, such as the type manufactured by Signetics under designation NE 562, which preferably multiplies the system color subcarrier signal input by a factor of 4 in the phase locked loop to provide a 14.3 megahertz output signal via path 94 from phase locked loop 102. This 14.3 megahertz output signal from phase locked loop 102 is provided in parallel to a conventional NTSC sync generator, such as a Fairchile 3262 ADC MOS integrated circuit sync generator 92, and a conventional divide by four counter 103 in the phase locked loop whose output is the 3.58 megahertz signal provided to 102 to close the loop. The output of divide by 4 counter 103, as shown and preferred, is also provided in parallel to the input of a conventional divide by 96 digital delay counter 104 which, as will be described in greater detail hereinafter produces 96 counts of delay of the input or, in other words, one pulse after 96 counts of the 3.58 megahertz signal input. In addition to the 14.3 megahertz input signal from phase locked loop 102, sync generator 92, hereinafter termed the slave sync generator, receives a power reset pulse via path 90 from power reset generator 88 (FIG. 5) each time the power for the system 100 is turned on to lock all the circuits in the center of the display. As shown and preferred in FIG. 1, slave sync generator 92 preferably includes a conventional divide by 7 counter 105 which receives the 14.3 megahertz input via path 94 from phase locked loop 102, a conventional divide by 65 counter 106 whose input is the output of divide by 7 counter 105 and whose output is preferably approximately 31.5 killohertz, or twice the horizontal line frequency, provided via path 86 in parallel to the input to a conventional divide by 525 counter 107, whose output is approximately 59.94 hertz or the vertical field rate (two fields per frame), to the input to a conventional divide by 2 counter 109 whose output is approximately 15.75 kilohertz or the horizontal line frequency provided via path 82 and to the input to the portion of sync generator 92 termed the interlace decoder and composite generator 111, which comprises conventional decoder gating circuitry. Decoder 111 provides as an output via path 80 an even pulse signal for each frame which indicates whenever an even field in the frame is occurring, such signal being a conventional 30 hertz square wave, and, via path 78 a blanking signal output to the controlled device, such as a video tape recorder (not shown), a composite sync output via path 76 to the controlled device and a burst flag output via path 74 to the controlled device. In addition, the blanking output signal via path 78 is also provided in parallel as one input to a conventional two input OR/gate 132, to be described in greater detail hereinafter. Decoder circuitry 111, as shown and preferred in FIG. 1, also receives as inputs thereto the output of counter 107 provided via path 84 and the output of counter 109 provided via path 82 which signals are respectively the vertical field rate and the horizontal line frequency. Slave sync generator 92 also preferably includes a conventional divide by 4 counter 108 which also is preferably capable of producing a 3.58 megahertz quasisinusoid in conventional fashion from the slave sync generator chip 92, the input to counter 108 being the 14.3 megahertz output, by way of example, of phase locked loop 102, with counter 108 preferably being reset to 0 by the power reset pulse provided via path 90. It should be noted that if a single MOS integrated circuit chip sync generator 92 is not used, but rather component circuitry equivalent thereto is used, counter 108 may be omitted and counter 103 may serve both the function described herein as well as the function of counter 108. The output of counter 108 is preferably fed as the input to a conventional color subcarrier shaper and buffer 110, such as the type shown in greater detail in FIG. 6, which provides, as shown in FIG. 6, as outputs therefrom the buffered or amplified 3.58 subcarrier output via path 70 and the unbuffered 3.58 megahertz subcarrier output via path 68. As will be described in greater detail hereinafter, preferably the unbuffered 3.58 megahertz output provided via path 68 is in phase with the system color subcarrier and is provided as one input to a conventional voltage controlled switch or video gate 128.

Now describing the master sync generator portion of the preferred embodiment shown in FIG. 1, the master sync generator preferably comprises an MOS integrated circuit NTSC sync generator similar to sync generator 92 with the exception that master sync generator 66 preferably includes a genlock detector, such as a conventional Fairchild 3262 BDC. The input to the master sync generator 66 is preferably provided from a parallel connection of the 14.3 megahertz output of the phase locked loop 102 provided via path 94 to a conventional divide by 7 counter 112 similar to counter 105 whose output is in turn is provided as the input to a conventional divide by 65 counter 113 similar to counter 106 and whose output via path 64 is twice the horizontal line frequency. The output of counter 113 is provided in parallel to the input to a divide by 525 counter 114 similar to counter 107 whose output via path 62 is the vertical field rate, to the input to a conventional divide by 2 counter 115 similar to counter 109 whose output is the horizontal line frequency, and to one input to an interlace decoder and composite generator gating circuit 117 similar to decoder 111. Decoder 117 also receives as inputs thereto the output of counter 115, which is the horizontal line frequency, and the output of counter 114, which is the vertical field rate, and provides as outputs therefrom an even pulse signal each even field in the frame, via path 60, and an odd pulse signal each odd field in the frame, via path 58, to the reset and set inputs, respectively, of a conventional flip-flop 118 which provides an output pulse via path 56 each time flip-flop 118 is reset each even field. Decoder 117 also conventionally provides as outputs therefrom a composite sync signal via path 54, a burst flag signal via path 52 and a blanking signal via path 50, with the composite sync signal 54 being provided as the other input to the two input video gate or switch 128, the burst flag signal provided via path 52 being the control input for video gate 128, and with the blanking signal provided via path 50 being the other input to two input OR/gate 132. As shown and preferred in FIG. 1, master sync generator 66 includes a conventional genlock detector 116 which functions in conventional fashion to detect the vertical sync in the composite sync input and determine the start of the horizontal and vertical intervals as well as the even and odd fields and lock the master sync generator chip 66 to the incoming composite sync. The incoming composite sync is delayed sync provided as the output of a conventional sync delay line 119, such as conventional RC timing circuitry of the type illustrated by way of example in FIGS. 4 and 5, with the input to the sync delay circuit 119 preferably being the system or plant composite sync, the sync delay 119 preferably being variable so that the horizontal sync out of the master sync generator 66 can be phased with the system horizontal sync.

Referring once again to flip-flop 118, the $\overline{Q}$ output of flip-flop 118 is provided via path 56 in parallel as one input to two conventional two input AND gates 120 and 121. The other input to AND gate 120 is the vertical field rate or vertical drive output provided via path 84 from counter 107 and the other input to AND gate 121 is the vertical field rate output of counter 114 provided via path 62. It should be noted that the vertical field rate input to AND gate 120 provided via path 84 and the vertical field rate input to AND gate 121 provided via path 62 do not normally occur at the same time except when the image is centered in its normal display or non-repositioned (unmoved) position. Thus, the reset output of flip-flop 118 via path 56 provides an enable signal to gates 120 and 121. The output of AND gate 120, provided via path 48, is the leading edge of the vertical field rate pulse output of counter 107 and is provided in parallel in a feedback loop as the drive pulse to an UP delay single shot network 124 which preferably delays the pulse output of counter 107 for two horizontal lines and provides a reset pulse therefrom to the reset input of counter 107 which resets counter 107 one horizontal line before the vertical drive output via path 84 equals 0, each time switch 124e is closed to close the loop and an input pulse is provided to single shot 124, and in a feedback loop to a down delay single shot network 125 which preferably delays the pulse output of counter 107 for four horizontal lines and provides a reset pulse therefrom to the reset input of counter 107 which resets counter 107 one horizontal line after the vertical drive output via path 84 equals 0 when switch 125f is closed to close the loop and an input pulse is provided to single shot 125.

Thus, the outputs of single shots of 124 and 125 with switches 124e and 125f closed, respectively, provides a vertical reset pulse to counter 107 from the delayed output of counter 107 which, as will be described in greater detail hereinafter, changes the frequency of the normal reset of counter 107 to effect upward and downward movement, respectively, of the originally generated image to reposition the displayable image upwardly or downwardly from its normal display position on a video display screen.

With respect to left and right movement or repositioning of the displayable image, as will be described in greater detail hereinafter, this is accomplished by conventional single shot delay networks 122 and 123 which accomplish left and right, respectively, repositioning or movement of the originally generated displayable image. The input to single shots 122 and 123 is the output of divide by 96 digital delay counter 104 with the outputs of 122 and 123 being connected in parallel through switches 122C and 123D, respectively, in a closed feedback loop with the reset inputs of counter 105 106 and 109 to provide a horizontal reset signal thereto from the delayed even pulse output of counter 104 with single shot 122 preferably delaying the output pulse of counter 104 for a sufficient time so that when counter 106 is at a count of 64 but before counter 105 reaches a count of 6, a horizontal reset pulse is provided through the loop via path 42 with the respective switch 122c closed, each time the delayed even pulse is provided. With respect to single shot 123, it preferably delays the delayed even pulse output of counter 104 a sufficient time so that when counter 106 is at 0 and after counter 105 reaches a count of 1 but before counter 105 reaches a count of 6, a horizontal or reset pulse is provided through the loop via path 42 with respective switch 123D closed each time the delayed even pulse is provided. Thus, the outputs of single shots 122 and 123 with switches 122C and 123D closed, respectively, provides a horizontal reset pulse to counters 105, 106 and 109 from the delayed even pulse output of counter 104 which, as will be described in greater detail hereinafter, changes the frequency of the normal reset of counters 105, 106 and 109 to effect leftward and rightward movement, respectively, of the originally generated image to reposition the displayable image leftwardly or rightwardly from its normal display position on a video display screen.

Figure 7:
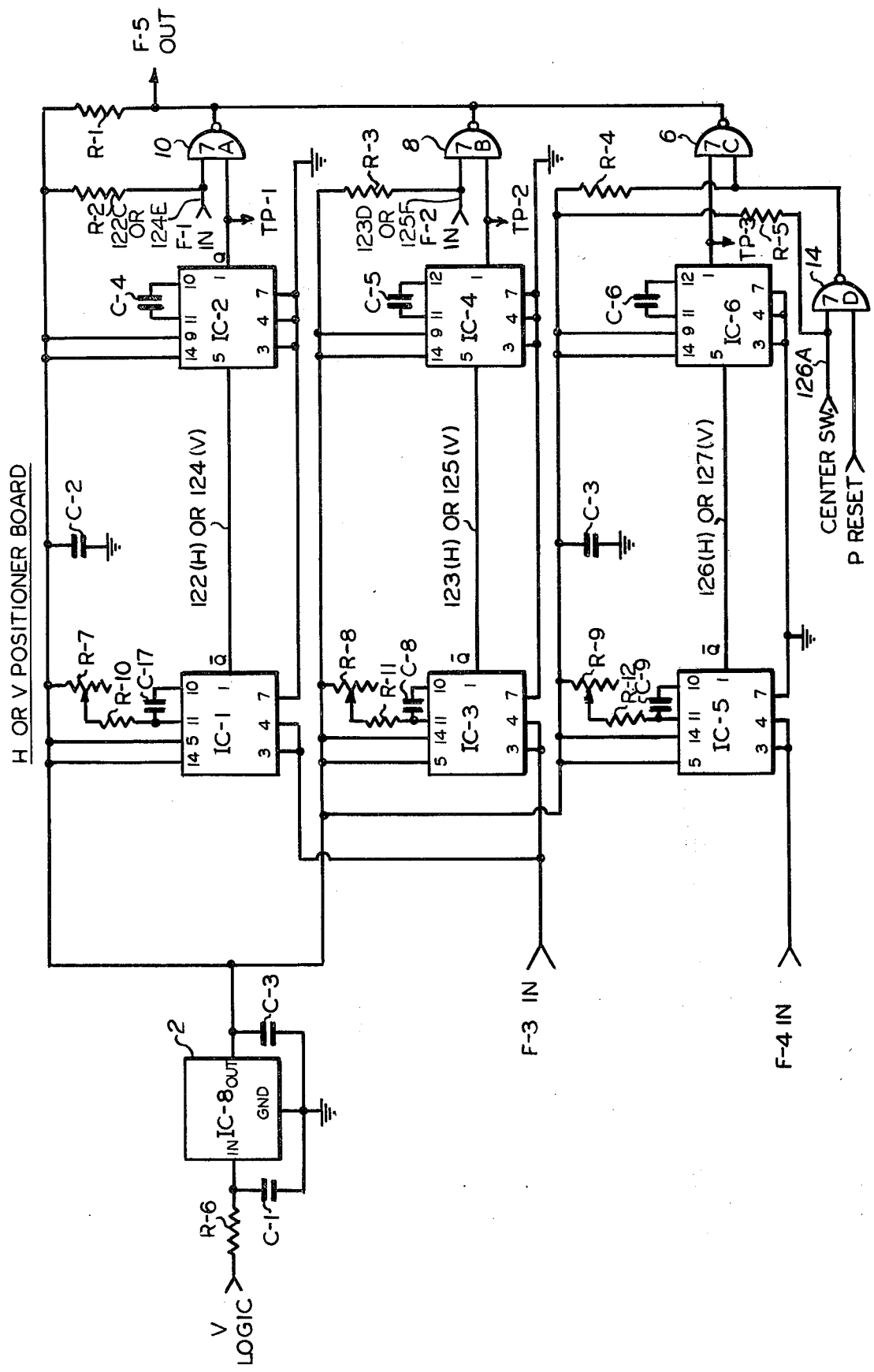
FIG. 7 is a logic block diagram partially in schematic of the vertical or horizontal positioning circuitry portion of the embodiment shown in FIG. 1.

With respect to centering of the displayable image, this is accomplished by phase locking the slave sync generator 92 to the master sync generator 66. The output of AND gate 121 is preferably provided in parallel to variable HORIZONTAL CENTER delay and VERTICAL CENTER delay single shot networks 126 and 127, respectively with single shot 126 preferably delaying the leading edge of the vertical field rate pulse output of counter 114 one horizontal line and resetting counters 105 and 106 to sync the reset of counters 105 and 106 of slave sync generator 92 with the reset of counters 112 and 113 of master sync generator 66 to phase lock the master 66 and slave 92 sync generators for horizontal centering of the image with ganged switch 126A closed and with single shot 127 preferably delaying the leading edge of the vertical field rate pulse output of counter 114 three horizontal lines to sync the reset of counter 107 of slave sync generator 92 with the reset of counter 114 of master sync generator 66 to phase lock the master 66 and slave 92 sync generators for providing vertical centering for the image with ganged switch 126A closed. As shown and preferred, single shots 122, 123, 124, 125, 126 and 127 all preferably comprise conventional single shots such as the type manufactured by Texas Instruments under designation no. SN 74121 with the circuit arrangements thereof being shown by way of example in greater detail in FIG. 7. Switches 122C, 123D, 124E, 125F, and ganged switch 126A are preferably termed move buttons or switches as they all control movement or repositioning of the original displayable video image with one pulse per frame preferably being provided from single shots 122, 123, 124 or 125 as long as switch 122C, 123D, 124E or 125F, respectively, is closed, with the image being centered when ganged switch 126A is closed.

Figure 8:
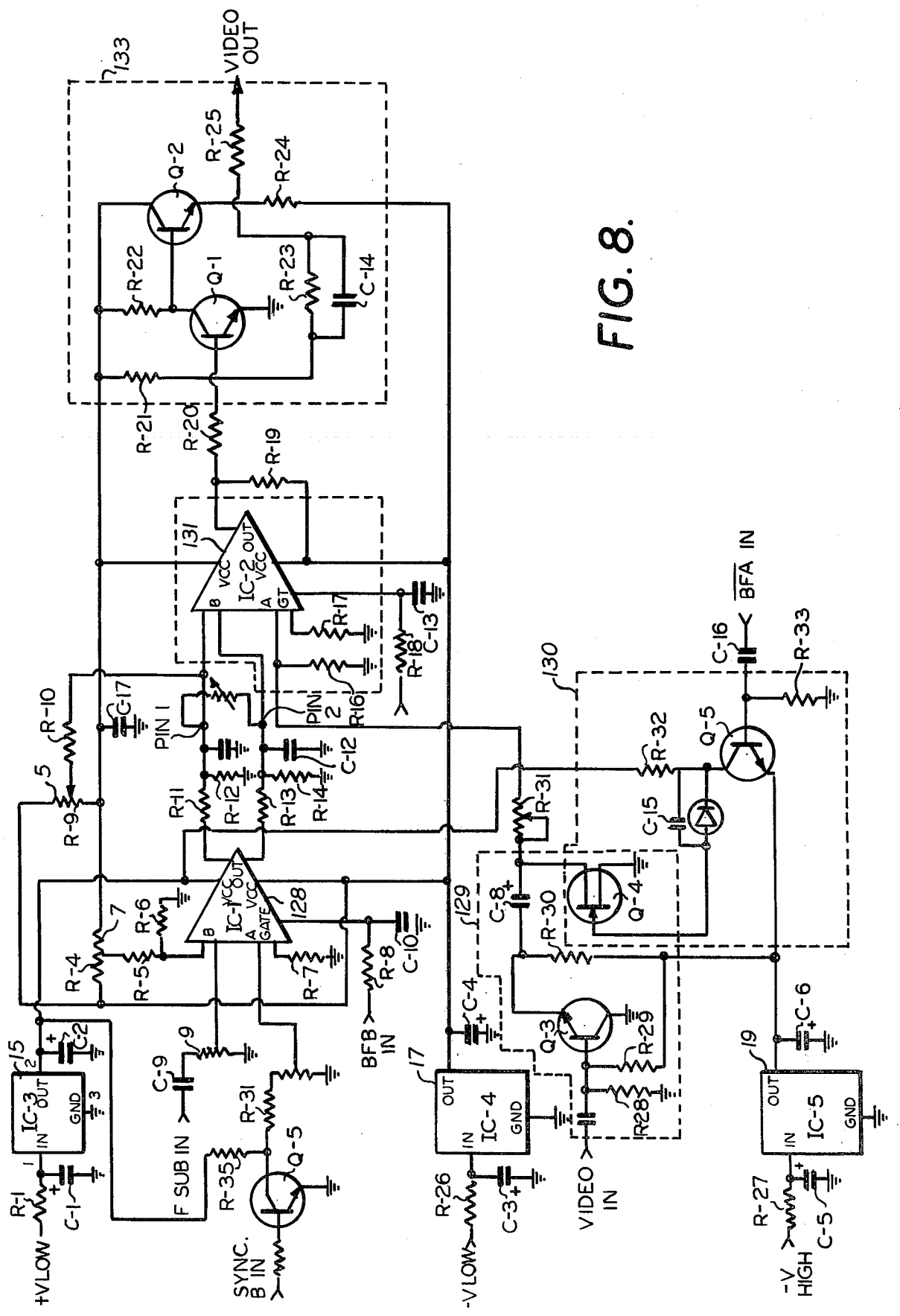
FIG. 8 is a logic block diagram partially in schematic of the video processing and reinsertion circuitry portion of the embodiment shown in FIG. 1.

As was previously mentioned, video gate or switch 128 is preferably a conventional video gate, such as a Motorola MC 1445G video gate which selects between inputs A and B provided via paths 68 and 54, respectively, with the input provided via path 68 preferably being the 3.58 megahertz unbuffered sine wave subcarrier phased with the system color subcarrier and with the input provided via path 54 preferably being the system composite sync which is preferably normal monochramatic black with sync. Preferably, the normal position of video gate 128 is shown by the solid line in FIG. 1 with the output of gate 128 connected to path 54 to provide the output therefrom. The control signal for gate 128 provided via path 52, as was previously mentioned, is preferably the burst flag and provides burst in sync with the system sync, the burst flag control signal providing subcarrier burst at the proper timing in the composite sync signal output of video gate 128. Thus, the output from video gate 128 is preferably color black with the addition of the color burst to the system composite sync converting the normal monochromatic black signal to a color black signal which is video with no picture information, the color black signal being provided via path 40 as one input to another conventional two input video gate 131, such as another Motorola MC 1445G the other input to video gate 131 preferably being a DC restored video signal clamped on the back porch which is provided via path 38 from conventional buffer amplifier 129 whose input via path 36 is the normal video input from the controlled device, such as a video tape recorder, with DC restoration being provided via conventional DC restoration and clamping circuitry 130 (FIG. 8). As shown and preferred in FIG. 1, the normal position of video gate 131 is shown by the solid line position with the input of gate 131 connected to path 38 to provide the output of video gate 131. The output of video gate 131 is provided via path 34 to a conventional buffer amplifier 133 to provide a repositioned displayable image video output signal, such as shown in FIG. 2B or 3C, via path 32. The control input for video gate 131 is preferably provided from OR/gate 132 via switch 30g which is normally closed as shown by the solid line in FIG. 1. When switch 30g is in the normally closed position, the blanking pulse from either the slave sync generator 92 or the master sync generator 66 is provided as the control signal input to video gate 131 to switch gate 131 to the color black input thereto provided via path 40. Thus, when slave sync generator 92 is in the blanking mode, it blanks out the sync pulse present on the normal video input via path 36, and when the master sync generator 66 is in the blanking mode, video gate 131 inserts the new sync signal generated from the master sync generator 66 in the proper place to provide the repositioned displayable video signal output via path 34 through buffer amplifier 133 to path 32.

It should be noted that in operation of the system 100 shown in FIG. 1, the leading edge of the even signal output of decoder 111 enables counter 104 to go up to a count of 96 once, the leading edge of the even signal being delayed 96 counts of subcarrier to provide the delayed even pulse output of counter 104 to single shots 122 and 123. Furthermore, it should be noted that with respect to the operation of color subcarrier shaper and buffer circuit 110, this circuit preferably functions as a bandpass filter to smooth out the 3.58 megahertz quasisinusoidal wave output of counter 108, with the buffered 3.58 megahertz subcarrier output provided via path 70 being provided to the controlled device, such as a video tape recorder. Furthermore, with respect to gating circuits 120 and 121, the vertical field rate signal provided from slave generator 92 is preferably variable in phase depending on the positioning of the displayable image while the vertical field rate signal provided from master sync generator 66 is locked to the composite sync input, the outputs of gates 120 and 121 being, respectively, the associated leading edges of the associated vertical pulses. It should be noted that the leading edge of the vertical pulse output of gate 121 preferably corresponds to the leading edge of the horizontal pulse as a result of flip-flop 118 which insures that the vertical pulse output of gate 121 corresponds to the horizontal pulse.

Referring now to FIG. 4, a more detailed schematic of the master and slave sync generators 66 and 92, respectively, is shown with associated conventional circuitry. The interconnection of the sync generators 66 and 92 with the associated circuitry, such as phase locked loop 102 and divide by four counter 103 and flip-flop 118, apart from that previously described with reference to FIG. 1, is conventional and readily understandable by one of ordinary skill in the art from FIG. 4 as shown and, thus, will not be described in greater detail hereinafter. Suffice it to say that in addition, integrated circuit chips 28, 26 and 24 which are provided are conventional power supplies with the respective chips being, by way of example, of the type manufactured by National Semiconductor under designations LM340T-15, LM309H and LM320H-12. Similarly, FIG. 5 conventionally illustrates the sync delay circuitry 119 which, as previously mentioned, and as illustrated in FIG. 5, is a conventional RC delay circuit which need not be described in greater detail hereinafter. The divide by 96 digital delay counter is preferably convention and as shown and preferred in FIG. 5, preferably comprises three integrated circuit TTL chips, 16, 18 and 20 such as Texas Instruments SN 74121 (chip 16) and 7493N chips (18 and 20), with associated conventional circuitry, although any conventional divide by 96 digital delay counter may be utilized. The power reset generator 88 illustrated in FIG. 5 is preferably a conventional circuit utilizing an integrated circuit National Semiconductors 555 chip 87 and associated transistor stages to provide the power reset pulse via path 90. The balance of the circuitry shown in FIG. 5 is conventional and readily understandable to one of ordinary skill in the art from the previous description of FIG. 1 except to say that there is an associated conventional power supply 14, such as National Semiconductor LM309H integrated circuit chip.

Referring now to FIG. 6, a more detailed schematic of the conventional color subcarrier shaper and buffer 110 of the type presently preferred in the system 100 of the present invention is shown by way of example, although any other conventional color subcarrier shaper and buffer may be utilized in place thereof without departing from the spirit and scope of the present invention. The balance of the circuit will not be described in greater detail hereinafter as it is conventional and readily understood by one of ordinary skill in the art. Suffice it to say that 110 utilizes two conventional power supplies 200 and 202, such as National Semiconductor types LM309H and LM320H-5 respectively. Similarly, with respect to FIG. 7, a more detailed schematic of the conventional single shot networks 122, 123, 126 for horizontal positioning, or 124, 125, 127 for vertical positioning is shown, these circuits preferably being conventional as previously described with respect to FIG. 1 with two single shots, such as type Texas Instruments SN74121 being utilized for each single show delay network 122, 123, 126 or 124, 125, 127 and with gates 10, 8 and 6 being associated, respectively, with switches 122C or 124E for gate 10, 123D or 125F for gate 8, or 126A for gate 6 to provide the reset output therefrom. Gate 6, in addition, has an associated output gate 4. Apart from the addition of gates 4, 6, 8 and 10 and the use of a pair of single shots for the respective delay single shot networks 122 or 124, 123 or 125, 126 or 127, and the addition of a conventional power supply 2, such as an integrated circuit National Semiconductor LM309H, the balance of the circuitry is as previously described with reference to FIG. 1 and is conventional and will not be described in greater detail hereinafter.

Referring now to FIG. 8, the video processing circuitry is shown in schematic in greater detail. This circuitry apart from the description in FIG. 1 is preferably conventional with the conventional video gates 128 and 131 being shown with their associated circuitry, with conventional buffer amplifier 133 being illustrated in more detail and with the conventional DC restoration circuitry for the video comprising buffer amplifier 129 and clamping circuit 130 being shown in greater detail. In addition, as shown and preferred in FIG. 8, various signal levels may be adjusted by potentiometers, such as adjusting the burst and sync amplitude via potentiometer 3, the pedestal by adjusting potentiometer 5, the burst offset by adjusting potentiometer 7, the burst level by adjusting potentiometer 9, the sync level by adjusting potentiometer 11, and the video level by adjusting potentiometer 13. For purposes of completeness, associated conventional power supplies 15, 17 and 19 are illustrated in FIG. 8, such as integrated circuit power supplies manufactured by National Semiconductor under designations LM309H, LM320H5 and LM320H-12, respectively. The balance of the circuitry is conventional and will be readily understood by one of ordinary skill in the art and will not be described in greater detail hereinafter.

OPERATION

As previously described, the system of the present invention 100 preferably employs two sync generators, a master 66 and a slave 92. The master 66 locks up with and maintains its phase relationship with the system reference sync while the slave generator 92 can be shifted out of phase by a controlled amount. The slave sync outputs are utilized to control the originally generated image producing device, such as a camera or playback device, such as a video tape recorder. The controlled device will follow the phase of the slave sync generator 92 so that its output will be out of phase with the system reference sync. At this point, the sync output from the controlled device is out of phase with the system reference sync and it is necessary to insert the correct sync timing on to the video output of this controlled device to enable it to interface with other studio or plant equipment. In accomplishing this, the master sync generator 66 counts down from the 14.3 megahertz signal which was derived by multiplying the system color subcarrier by a factor of four in the phase locked loop 102. Counter 108 and color subcarrier shaper and buffer 110 regenerate the subcarrier signal with correct phase and output it to the controlled device, such as a video tape recorder. The digital countdown times out the horizontal and vertical pulses but cannot phase them. The system composite sync is needed to put the horizontal and vertical sync pulses in the correct phase. Sync delay 119 delays or advances the system sync slightly to make up for cable delays and then genlock detector 116 preferably separates the vertical and horizontal pulses so that they can reset their respective counters 112, 113, 114 and 115 at the correct time. Decoder 117 derives the other E.I.A. sync signals, burst flag and blanking, and regenerates composite sync. The master sync generator 66 is now locked to the system. The slave generator 92 preferably uses the same 14.3 megahertz clock as the master sync generator 66 so that the two need only be phased up to each other. Closing switch 126A takes horizontal and vertical pulses from the master generator 66 and delays them through single shot networks 126 and 127 so that the pulses reset the horizontal and vertical slave counters 105, 106, 109 (horizontal) and 107 (vertical) at the correct time. The slave generator 92 is now phase locked to the master generator 66. The slave sync generator 92 outputs are shifted in phase with respect to the master 66 by resetting the countdown at a different time than master generator 66 is reset. In other words, by altering the reset frequency of the slave counters from their normal reset frequency. This is accomplished by a feedback loop in the slave generator 92 whereby the output of a counter, such as counter 107, after a suitable delay, is used to reset itself. Divider 104 counts subcarrier cycles and is enabled by an even frame pulse in sync with horizontal. If switch 122C or 123D is closed, counters 105, 106 and 109 are reset either before or after they would normally have 0 counts as previously described. As long as 122C or 123D are closed, the effect is that of the slave generator 92 changing phase by a fixed amount each frame with respect to the master generator 66. When switches 122C and 123D are open, the counters 105-106-109 reset at the normal 0 count and phase change stops. The vertical chain operates in the same manner but the delay times are different in the feedback loop 120-124-125. Flip-flop 118 and gate 120 maintain proper interlace between the master 66 and slave 92 generators during the phase change operation by feeding back only even field vertical pulses and thereby delaying or advancing vertical reset by an integral number of horizontal pulses as previously described. The slave generator 92 output pulses are EIA in form and go to the controlled device, all six normal signals being available: composite sync, horizontal drive, vertical drive, blanking, subcarrier and burst flag.

Video from the controlled device has to be processed as it is not in phase with system or plant sync. In processing this video, video gate 128, which is a voltage controlled switch, switches switches between subcarrier and composite sync according to the master generator 66 burst flag. As was previously mentioned, the output of gate 128 is color black, which is sync with burst but no video. The video from the controlled device is buffered and clamped by 129–130 with gate 131 alternating between video and colorblack from gate 128. Blanking signals from the master 66 and slave 92 generators are ored in gate 132 and used to switch gate 131 to color black during either blanking interval. The result of this is that slave generator 92 blanking effectively erases the slave generator 92 sync on the video and the master generator 66 switches gate 131 to colorblack during the system blanking interval. Switch 30g bypasses the sync reinsertion so that the slave generator 92 subcarrier output can, if desired, be phased to the system with a conventional system vectorscope. As shown and prefererred in FIG. 1, in repositioning an image, switch 30g is normally in the non-bypassed position. Thus, the resultant video output provided via path 32 contains video picture information from the phase shifted playback unit and timing information in phase with the system or plant sync.

Referring now to FIG. 2, a graphic illustration of the various signals present in utilizing the system 100 of the present invention is shown. FIG. 2A graphically illustrates the output of the controlled device, such as a video tape recorder, present at path 36 in FIG. 1, the horizontal interval of the signal being labeled as is the video information portion of the signal. FIG. 2B illustrates the output of gate 131 present on path 34 illustrating the insertion of the sync from the blanking of the master generator 66 as well as the blanking out of the original horizontal interval sync in the signal of FIG. 2A and the insertion of colorblack in place thereof. FIG. 2B effectively illustrates that the displayable image or video picture has moved from before the horizontal interval to just after the horizontal interval which illustrates movement of the image from the right half to the left half of the screen by way of example. FIG. 2C illustrates a typical system background video signal into which the repositioned image of FIG. 2B is to be conventionally keyed by a pulse derived by clipping the high amplitude video portion of the waveform of FIG. 2B, and FIG. 2D illustrates the final signal of the keyer which is produced from the video output signal on path 32, which is the signal of FIG. 2B, and the system background video signal of FIG. 2C in conventional fashion by a conventional keyer, with the image in FIG. 2A being moved from the right half to the left half of the screen and the background video taking up the remainder of the screen.

Lastly, FIGS. 3A through 3E, illustrate the concepts described with reference to FIGS. 2A through 2D in better detail. By way of example, FIG. 3 illustrates three different signal levels of video labeled A, B, and C with C representing the background video signal such as illustrated in FIG. 2C. As shown in FIG. 3A, signal level A occupies the left hand portion of the screen and signal level B occupies the right hand portion of the screen in the normal video output of the controlled device, such as a video tape recorder, without repositioning or keying occuring. FIG. 3B represents the repositioned image signal present at path 36 in FIG. 1 with signal level B being provided now on the left hand portion of the screen and signal level A being provided on the right hand portion of the screen, the horizontal interval now occuring in the middle of the signal as illustrated in FIG. 3 instead of in its original position. FIG. 3C illustrates the output of gate 131, as illustrated in FIG. 2B, with the sync now in the proper location in the repositioned image A, by way of example, with color black being inserted in place of the horizontal interval appearing in FIG. 3B and with the sync being inserted in the proper place in FIG. 3C. FIG. 3D illustrates the system background video together with which the repositioned image is wiped and is analogous to FIG. 2C as was previously described. FIG. 3E represents the final wiped signal output of the system which is provided from conventionally combining the system background video signal of FIG. 3D with the repositioned video signal output provided via path 32 as shown in FIG. 3C to produce the repositioned A image on the right hand portion of the screen with the background video image occupying the left hand portion of the screen as well as, in the example shown, covering the black band portion 1000 present in the FIG. 3 signal when the color black replaces the repositioned horizontal interval.

Thus, by utilizing the image repositioning system of the present invention, the position of an image may be altered without rescanning of the originally generated image in systems, such as video tape recording systems, requiring precise sync timing.

What is claimed is:

1. An apparatus for altering the displayable position of an originally generated video image on a video display device without rescanning of said originally generated image, said apparatus being responsive to an externally generated system reference sync signal, said image being originally generated by a controllable image producing device utilizing a raster type scan for providing an originally generated video signal having a video picture portion and a composite sync portion, said video display device being operable with said controllable image producing device for producing a display of said video for said video signal image, said apparatus comprising means for receiving a system color subcarrier reference signal and generating a clock signal therefrom, a master sync signal processing means for locking to and maintaining a predetermined phase relationship with respect to said externally generated system reference sync signal to provide a master sync signal; a slave sync signal generation means having a variable controllable phase shift, said slave sync signal generation means comprising first digital counting means operatively connected to said system color subcarrier receiving means and being responsive to said clock signal for providing a first respective horizontal line frequency video signal output and a first respective vertical field rate video signal output therefrom, said slave sync signal generation means outputs being provided to said controllable image producing device for control of the displayable image provided therefrom, said first digital counting means being resettable, means for providing a feedback loop between each of the respective outputs of said first digital counting means and each of the respective reset inputs thereof, said first digital counting means having normal vertical and horizontal rate reset frequencies corresponding to the frequencies of the vertical and horizontal sync components, respectively of said master sync signal processing means, each of said feedback loops comprising means for controllably varying the vertical and horizontal reset frequencies of said digital counting means from said normal reset frequencies, said reset frequency varying means comprising means for providing a reset pulse derived from said first digital counting means respective output to said digital counting means respective reset input at a predetermined controlable interval different from said normal reset frequencies of said first digital counting means, said first digital counting means effectively providing a controllable predetermined phase shift in said slave sync signal outputs with respect to said master sync signal when said reset frequencies are controllably varied; and means for processing the normal video output from said controllable image producing device with said slave sync signal generation means outputs for both inserting said master sync signal in the phase shifted video picture portion of the originally generated video signal and providing a black representative signal in place of said phase shifted originally generated composite sync, whereby a video output signal comprising phase shifted originally generated video picture information and timing information in phase with system sync is provided for producing a repositioned displayable video image.

2. An apparatus in accordance with claim 1 wherein said master sync signal processing means comprises master-sync signal generation means for receiving said system reference sync signal input and being responsive thereto for locking to and maintaining a predetermined phase relationship with said received system reference sync signal, said master sync signal generation means comprising second digital counting means operatively connected to said system color subcarrier receiving means and being responsive to said clock signal for providing a second horizontal line frequency video signal and a second vertical field rate video signal therefrom, said second horizontal line frequency video signal and said second vertical field rate video signal being phase locked to said system reference signal sync, said second digital counting means being resettable at a reset frequency in accordance with said system reference sync signal frequency, said second digital counting means reset frequency comprising said master sync signal processing means reset frequency, said first digital counting means normal reset frequency corresponding to said second digital means reset frequency.

3. An apparatus in accordance with claim 2 further comprising means operatively connected between said master and slave sync signal generation means for phase locking said slave sync signal generation means to said master sync signal generation means for centering said displayable video image in its original displayable position.

4. An apparatus in accordance with claim 2 wherein said clock signal generating means comprises a phase locked loop means for providing a predetermined multiple of said color subcarrier as said clock signal input to said first and second digital counting means, said first and second digital counting means counting down from said clock signal for providing said first and second horizontal line frequency and vertical field rate signals therefrom.

5. An apparatus in accordance with claim 2 wherein said slave sync signal generation means further comprises means for providing a first even pulse signal output therefrom in response to said first horizontal line frequency signal whenever an even field in a video frame occurs; said first even pulse providing means being in said first digital counting means feedback loop, said means for controllably varying the reset frequency of said first digital counting means comprising first single-shot delay means and first switch means connected between said first single-shot delay means output and said first digital counting means reset input, said first even pulse output being operatively connected to said first single-shot delay means input, said first single-shot delay means delaying said even pulse input a predetermined interval each frame when said first switch means is in a first state in which said feedback loop is completed for providing a horizontal reset pulse to said first digital counting means at a different horizontal reset frequency than the normal horizontal reset frequency at which said first horizontal line frequency signal is produced from counting of said clock signal for shifting the phase of said slave sync generation means with respect to said master sync generation means by a predetermined amount each frame as long as said as said first switch means completes said feedback loop, whereby said displayable image is horizontally repositioned.

6. An apparatus in accordance with claim 5 wherein said first single-shot delay means comprises a first pair of single-shot delay means operatively connected in parallel to said even pulse output, one of said first pair of single-shot delay means having an associated delay time for varying said horizontal reset frequency by a first predetermined amount to horizontally reposition said displayable image to the right by said predetermined amount each frame and said other one of said first pair of single-shot delay means having an associated delay time for varying said horizontal reset frequency by a second predetermined amount to horizontally reposition said displayable image to the left by said predetermined amount each frame when said first switch means selectively completes the feedback loop between a selected one of said first pair of single-shot delay means outputs and said first digital counting means.

7. An apparatus in accordance with claim 2 wherein said master sync signal generation means further comprises means for providing a first even pulse signal output therefrom in response to said second horizontal line frequency signal whenever an even field in a video frame occurs; said apparatus further comprising switch means operatively connected to said first even pulse signal output for providing a first enable pulse output therefrom each time said first even pulse signal is received, and first condition responsive means operatively connected to said first digital counting means first vertical field rate signal output and said first enable pulse output for providing an output pulse therefrom in response to the presence of said first enable pulse output and the leading edge of said first vertical field rate signal, said first condition responsive means being in said first digital counting means feedback loop; said means for controllably varying the reset frequency of said first digital counting means comprising first single-shot delay means and first switch means connected between said first single-shot delay means output and said first digital counting means reset input, said first condition responsive means output being operatively connected to said first single-shot delay means input, said first single-shot delay means delaying said first condition responsive means output pulse a predetermined interval each frame when said first switch means is in a first state in which said feedback loop is completed for providing a vertical reset pulse to said first digital counting means at a different vertical reset frequency than the normal vertical reset frequency at which said first vertical field rate signal is produced from counting of said clock signal for shifting the phase of said slave sync generation means with respect to said master sync generation means by a predetermined amount each frame as long as said first switch means completes said feedback loop, whereby said displayable image is vertically repositioned.

8. An apparatus in accordance with claim 7 wherein said first single shot delay means comprises a first pair of single shot delay means operatively connected in parallel to said first condition responsive means output pulse, one of said first pair of single shot delay means having an associated delay time for varying said vertical reset frequency by a first predetermined amount to vertically reposition said displayable image upwardly by said predetermined amount each frame and said other one of said first pair of single shot delay means having an associated delay time for varying said vertical reset frequency by a second prdetermined amount to vertically reposition said displayable image downwardly by said predetermined amount each frame when said first switch means selectively completes the feedback loop between a selected one of said first pair of single shot delay means outputs and said first digital counting means.

9. An apparatus in accordance with claim 3 wherein said master sync signal generation means further comprises means for providing a first even pulse signal output therefrom in response to said second horizontal line frequency signal whenever an even field in a video frame occurs; and said phase locking means comprises switch means operatively connected to said first even pulse signal output for providing a first enable pulse output therefrom each time said first even pulse is received, first condition responsive means operatively connected to said second digital counting means second vertical field rate signal output and said first enable pulse output for providing an output pulse therefrom in response to the presence of said first enable pulse output and the leading edge of said second vertical field rate signal, first single-shot delay means, and first switch means connected between said first single-shot delay means output and said first digital counting means reset input, said first condition responsive means output being operatively connected to said first single-shot delay means input, said first single-shot delay means delaying said first condition responsive means output pulse a predetermined interval when said first switch is in a first state in which said first single-shot delay means output is connected to said first digital counting means reset input for providing vertical and horizontal reset pulses to said first digital counting means at the normal vertical and horizontal reset frequencies to phase lock said first and second digital counting means for vertically and horizontally centering said displayable image in said original displayable position.

10. An apparatus in accordance with claim 1 wherein said normal video output processing means comprises first video gating means operatively connected to said master sync signal processing means and said slave sync signal generation means for receiving said composite sync and a master sync burst flag for providing a black representative signal therefrom and second video gating means connected to said first gating means output and to said slave sync generation means and master sync signal processing means and said normal video output for receiving said black representative signal from said first gating means and associated blanking signals from said slave sync generation means and said master sync signal processing means for switching said second gate output between said black representative signal and said normal video output in response to said blanking signals, said second gating means output being said black representative signal when either of said associated blanking signals is provided thereto for providing said insertion when said master sync signal processing means provides said associated blanking signal and said black representative signal in place of said phase shifted originally generated composite sync when said slave sync signal generation means provides said associated blanking signal.

* * * * *